(12) United States Patent
Kurosu et al.

(10) Patent No.: US 8,294,545 B2
(45) Date of Patent: Oct. 23, 2012

(54) ELECTROMAGNETIC COUPLING DEVICE

(75) Inventors: Yoshihiro Kurosu, Gunma (JP); Shigeru Yuki, Gunma (JP)

(73) Assignee: Ogura Clutch Co., Ltd., Gunma (JP)

( * ) Notice: Subject to any disclaimer, the term of this patent is extended or adjusted under 35 U.S.C. 154(b) by 0 days.

(21) Appl. No.: 12/868,564

(22) Filed: Aug. 25, 2010

(65) Prior Publication Data

US 2011/0048888 A1 Mar. 3, 2011

(30) Foreign Application Priority Data

Aug. 28, 2009 (JP) ................................. 2009-197906
Jun. 28, 2010 (JP) ................................. 2010-145930

(51) Int. Cl.
*H01F 27/29* (2006.01)
*H01F 5/00* (2006.01)

(52) U.S. Cl. ......... 336/192; 336/185; 336/221; 335/299

(58) Field of Classification Search .................. 336/192, 336/185, 205, 221, 208, 164; 335/299, 296; 439/15, 378, 401, 402, 404, 418, 427, 387
See application file for complete search history.

(56) References Cited

U.S. PATENT DOCUMENTS

| | | | | |
|---|---|---|---|---|
| 4,181,393 A | * | 1/1980 | Lill | ............................... 439/402 |
| 4,429,358 A | | 1/1984 | Miyagi | |
| 4,623,754 A | * | 11/1986 | Kikuchi et al. | ............... 174/535 |
| 5,138,293 A | | 8/1992 | Ishimaru | |
| 5,307,038 A | * | 4/1994 | Ishimaru | ....................... 335/296 |
| 5,320,206 A | * | 6/1994 | Maejima | .................. 192/84.961 |
| 5,812,044 A | * | 9/1998 | Sakamoto | ...................... 335/299 |
| 5,967,282 A | * | 10/1999 | Takahashi | ................ 192/84.961 |
| 6,707,365 B2 | * | 3/2004 | Fuju | ............................... 336/185 |
| 6,914,507 B2 | * | 7/2005 | Fujiu | .............................. 336/192 |
| 7,772,946 B2 | * | 8/2010 | Oh et al. | ........................ 335/219 |

FOREIGN PATENT DOCUMENTS

| | | |
|---|---|---|
| JP | 58-008998 Y | 2/1983 |
| JP | 02-038105 Y | 10/1990 |
| JP | 2507943 Y | 5/1996 |

* cited by examiner

*Primary Examiner* — Mohamad Musleh
(74) *Attorney, Agent, or Firm* — Blakely, Sokoloff, Taylor & Zafman

(57) ABSTRACT

An electromagnetic coupling device includes a field core, a surge voltage absorbing member, and a storage member. The field core is provided inside an exciting coil. The surge voltage absorbing member is connected to the exciting coil. The storage member is made of an insulating material and includes a recess portion to store the surge voltage absorbing member. A through hole is formed in an outer wall of the field core. The storage member is inserted into the through hole with an opening of the recess portion facing the exciting coil. The surge voltage absorbing member is inserted in the recess portion so as to be positioned outside the field core by the exciting coil.

6 Claims, 15 Drawing Sheets

ELECTROMAGNETIC COUPLING DEVICE

BACKGROUND OF THE INVENTION

The present invention relates to an electromagnetic coupling device such as an electromagnetic clutch and an electromagnetic brake and, more particularly, to the mounting structure of a surge voltage absorbing member connected to an exciting coil.

Conventionally, a surge voltage absorbing member is connected to an exciting coil used in an electromagnetic clutch, an electromagnetic brake, or the like to absorb the surge voltage generated when the power supply is shut off. Conventional surge voltage absorbing members include a diode.

Conventional electromagnetic coupling devices including surge voltage absorbing diodes of this type are disclosed in, for example, reference 1 (Japanese Utility Model Publication No. 58-8998), reference 2 (Utility Model Registration No. 2507943), reference 3 (U.S. Pat. No. 5,138,293), and reference 4 (Japanese Utility Model Publication No. 2-38105).

A field core accommodates the surge voltage absorbing diode of the electromagnetic clutch disclosed in reference 1. An annular groove is formed in this field core so as to be positioned on the same axis as that of a rotor. This annular groove accommodates an exciting coil body formed by a winding and the diode.

Lead wires are respectively connected to the start and end of the winding of the exciting coil body. These lead wires are guided outside the field core through its outer peripheral wall. The diode is connected in parallel to the exciting coil body via the lead wires.

The exciting coil body and the diode are insulated and fixed inside the annular groove by injecting a synthetic resin material with insulating properties (to be simply referred to as a casting resin hereinafter) into the annular groove and hardening the resin.

The surge voltage absorbing diode of the electromagnetic clutch disclosed in reference 2 is mounted in an annular coil bobbin stored in an exciting coil body. This coil bobbin is inserted in the annular groove of a field core. That is, the diode disclosed in reference 2 is provided inside the field core together with the exciting coil body.

The coil bobbin has a storage portion in which the exciting coil body is stored, a storage portion in which the diode is stored, and grooves and holes for the inflow of a casting resin into the storage portions. The exciting coil body and the diode are insulated and fixed in the annular groove by injecting a casting resin into the annular groove and hardening the resin while the lead wires of the exciting coils are guided outside the field core.

The surge voltage absorbing diodes of the electromagnetic clutches disclosed in references 3 and 4 are provided outside the field cores.

The field core disclosed in reference 3 includes a coil bobbin to hold an exciting coil body. This coil bobbin is formed into an annular shape and loaded in the annular groove of the field core. The coil bobbin is provided with a wiring terminal block. A support fitting for connecting the winding end portions of the exciting coil to lead wires and a diode are mounted on the terminal block. The diode is connected to the winding end portions of the exciting coil and the lead wires on the terminal block.

This terminal block is provided on one end portion of the coil bobbin in the axial direction so as to protrude therefrom and is inserted in the through hole formed in the bottom portion of the annular groove. The diode is mounted on a portion of the terminal block which protrudes outside the field core.

A waterproof cover is placed on the terminal block from the outside of the field core. This cover is fixed to the outer surface of the field core by welding or adhesive bonding.

The surge voltage absorbing diode of the electromagnetic clutch disclosed in reference 4 is connected to the wiring parts of lead wires of an exciting coil which are located outside a field core. This diode is placed along the lead wires and is fixed to the lead wires with a heat shrinkable tube through which these members extend.

The surge voltage absorbing diodes disclosed in references 1 and 2 described above each are placed in the annular groove of the field core at a position near the exciting coil body. The heat generated by the exciting coil sometimes greatly increases the temperature inside the field core. In this case, the heat load on the diode increases. The heat may degrade the diode. That is, the heat may destroy the circuit of a diode element or deform the sealed resin of the package portion which seals the element.

According to each of the field cores disclosed in references 1 and 2, the storage space for the exciting coil body is narrowed by an amount corresponding to the space to store the diode. For this reason, the electromagnetic clutches disclosed in references 1 and 2 are smaller in the number of turns of an exciting coil than other types of electromagnetic clutches having similar sizes, and hence are lower in performance.

In each of the electromagnetic clutches disclosed in references 3 and 4, the surge voltage absorbing diode is placed at a position spaced apart from the exciting coil. For this reason, this diode is not likely to be influenced by the heat generated by the exciting coil. In this electromagnetic clutch, however, since the diode is positioned outside the field core, it is necessary to employ a structure for waterproofing the diode.

The waterproof structure disclosed in reference 3 is configured to fix the waterproof cover covering the diode to the field core so as to prevent water from entering the field core. The waterproof structure disclosed in reference 4 is configured to cover the diode with the heat shrinkable tube and cause the tube to heat-shrink to prevent water from entering the inside. The electromagnetic clutches disclosed in references 3 and 4 each employ the above waterproof structure, and hence the number of assembly steps increases, resulting in a decrease in productivity.

SUMMARY OF THE INVENTION

The present invention has been made to solve the above problems, and has as its object to provide an electromagnetic coupling device which can reduce the heat load on a surge voltage absorbing diode, broaden the storage space for an exciting coil inside a field core, and easily waterproof the diode.

In order to achieve the above object, according to the present invention, there is provided an electromagnetic coupling device comprising a field core provided inside an exciting coil, a surge voltage absorbing member connected to the exciting coil, and a storage member which is made of an insulating material and includes a recess portion to store the surge voltage absorbing member, wherein a through hole is formed in an outer wall of the field core, the storage member is inserted into the through hole with an opening of the recess portion facing the exciting coil, and the surge voltage absorbing member is inserted in the recess portion so as to be positioned outside the field core by the exciting coil.

DESCRIPTION OF THE PREFERRED EMBODIMENTS (First Embodiment)
An embodiment of an electromagnetic coupling device according to the present invention will be described in detail below with reference to FIGS. 1 to 12. This embodiment will exemplify a case in which the present invention is applied to an electromagnetic clutch.

Figure 1:
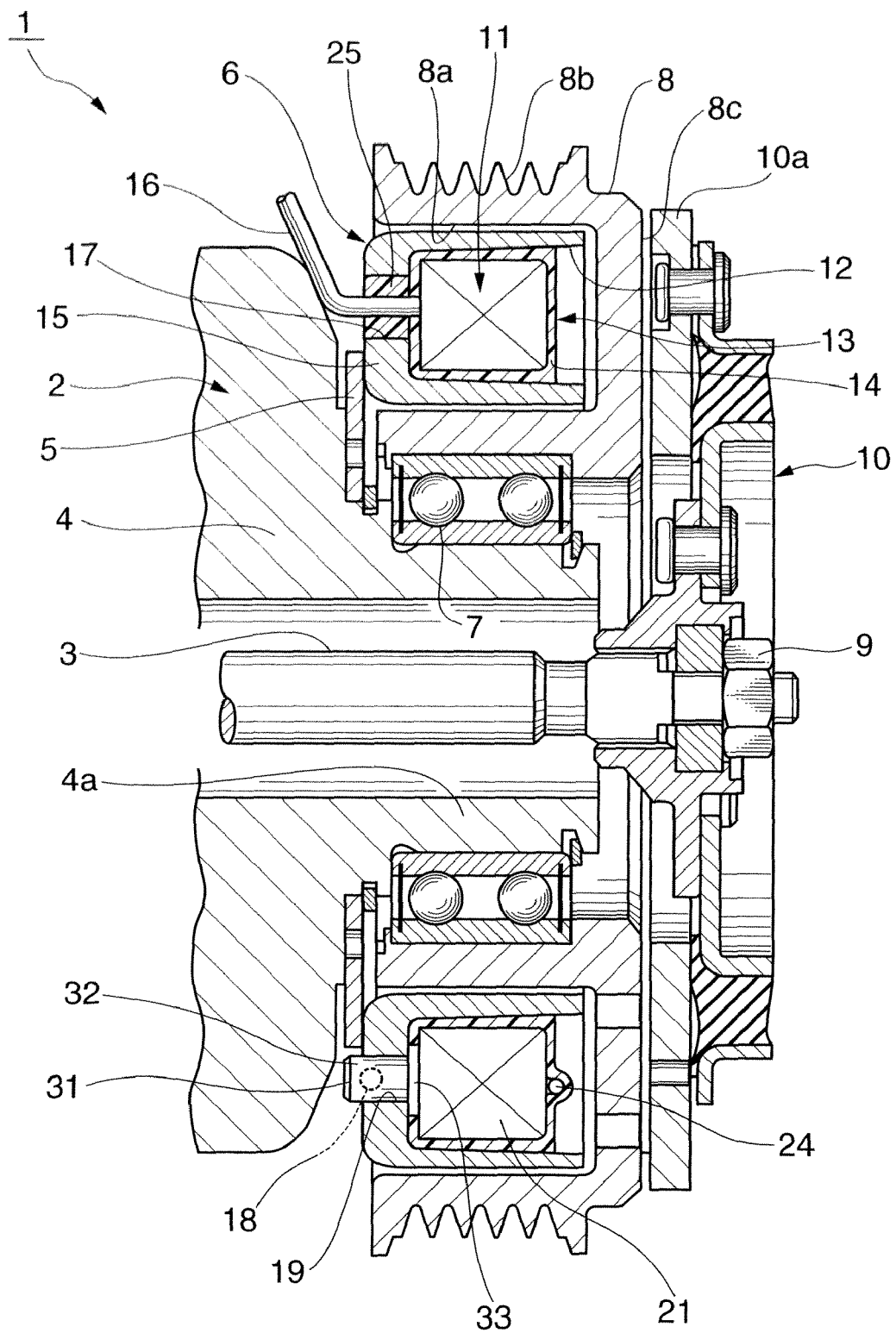
FIG. 1 is a sectional view of an electromagnetic clutch according to the present invention.

An electromagnetic clutch 1 shown in FIG. 1 serves to transfer power to a rotating shaft 3 of a car air conditioner compressor 2 or shut off the transfer of power. The electromagnetic clutch 1 includes a field core 6 fixed to a front housing 4 of the compressor 2 through a mounting plate 5. The electromagnetic clutch 1 includes a rotor 8 rotatably supported on a cylindrical portion 4a of the front housing 4 through a bearing 7. The electromagnetic clutch 1 includes an armature assembly 10 which is spline-fitted to the rotating shaft 3 and secured with a nut 9.

The field core 6 has an annular shape as a whole and is positioned on the same axis as that of the rotating shaft 3. The field core 6 is inserted in an annular groove 8a formed in the rotor 8. The rotor 8 rotates while the field core 6 is inserted in the annular groove 8a. A pulley groove 8b is formed in the outer circumferential portion of the rotor 8. The power of, for example, an engine (not shown) is transferred through a belt (not shown) wound around the pulley groove 8b. A friction surface 8c facing an armature 10a of the armature assembly 10 is formed on one end face of the rotor 8 in the axial direction.

In the electromagnetic clutch 1, when an exciting coil 11 (to be described later) provided in the field core 6 is excited, the armature 10a is attracted to the rotor 8. As a consequence, the rotation of the rotor 8 is transferred to the rotating shaft 3 through the armature assembly 10. In addition, shutting off the power supply to the exciting coil 11 will separate the armature 10a from the rotor 8 to shut off the transfer of the power.

As shown in FIG. 1, an annular groove 12 is formed in the field core 6 so as to extend in the circumferential direction of the field core 6. A coil assembly 13 having the exciting coil 11 is stored in the annular groove 12. The annular groove 12 is filled with a casting resin 14 having insulting properties while the coil assembly 13 is inserted in the annular groove 12. The coil assembly 13 is fixed in the annular groove 12 by hardening the casting resin 14 in the annular groove 12.

Figure 2:
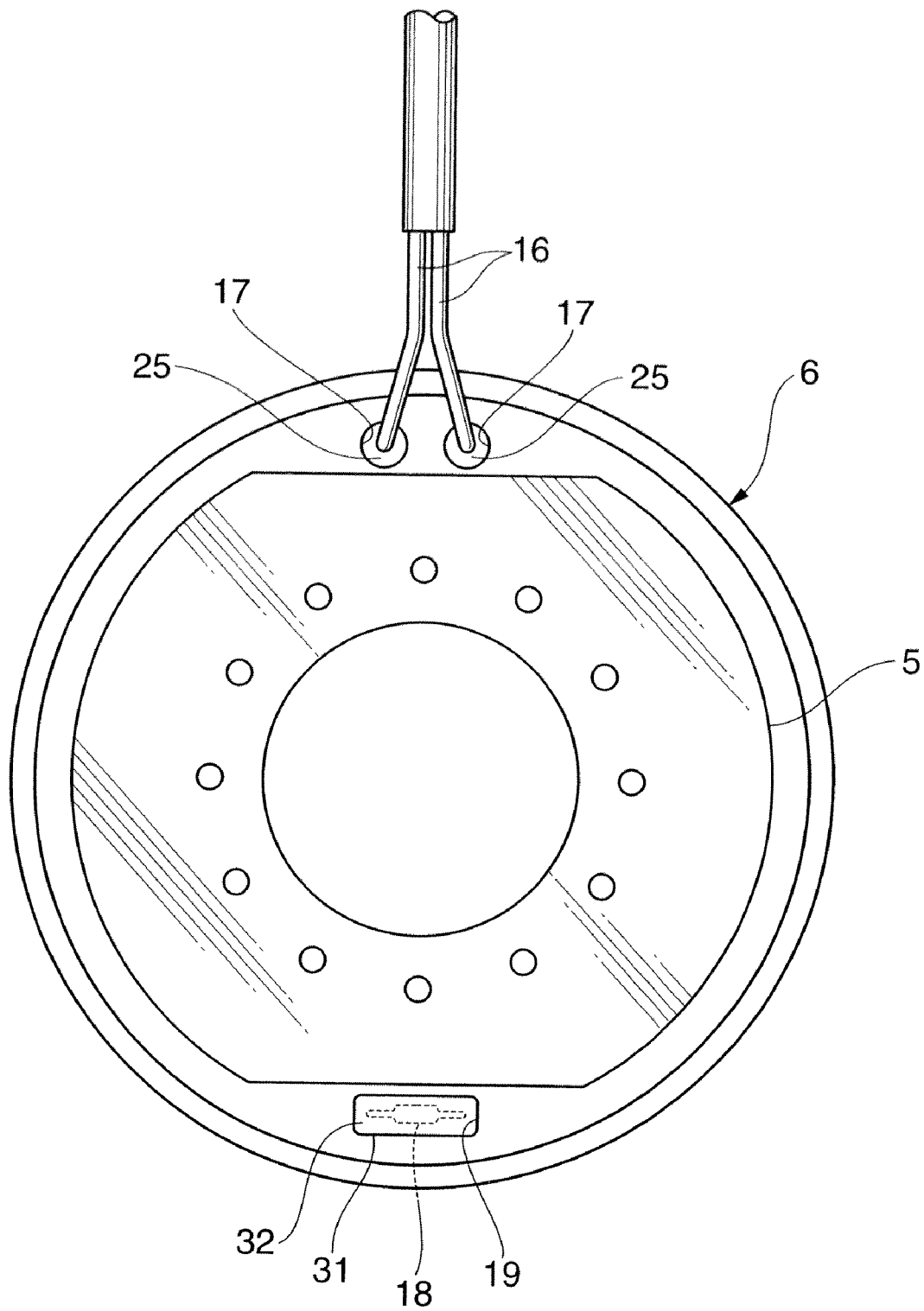
FIG. 2 is a rear view of a field core.

Lead wire extraction holes 17 to allow lead wires 16 (to be described later) to pass through and a diode storage hole 19 to store a diode 18 (to be described later) are formed in an outer wall 15 forming the bottom of the annular groove 12 in the field core 6. The holes 17 and 19 are formed to extend through the outer wall 15 in the axial direction of the field core 6. As shown in FIG. 2, the lead wire extraction holes 17 and the diode storage hole 19 are respectively positioned on one end and the other end of the field core 6 in the radial direction.

Figure 3:
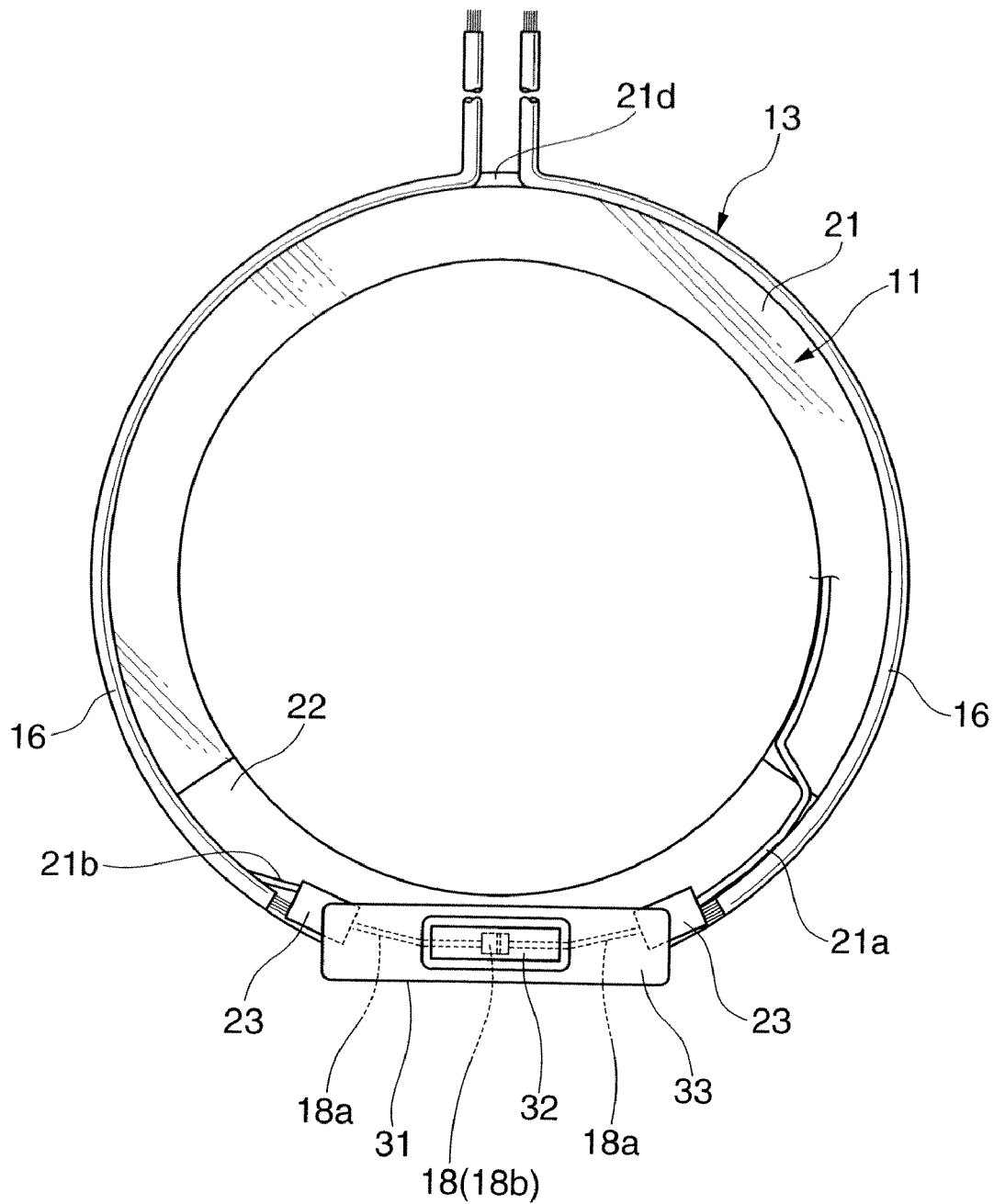
FIG. 3 is a rear view of a coil assembly.
Figure 4:
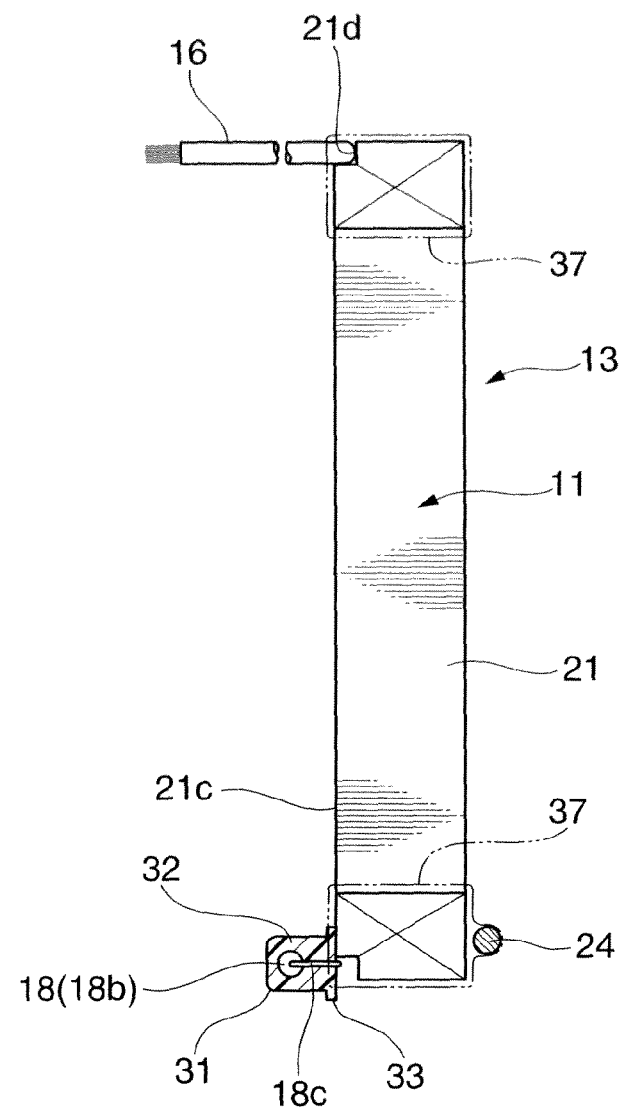
FIG. 4 is a sectional view of the coil assembly.

As shown in FIGS. 3 and 4, the coil assembly 13 is formed by connecting members (to be described later) to a cylindrical exciting coil body 21 forming the exciting coil 11. The exciting coil body 21 is formed into a cylindrical shape by winding an electric wire.

The exciting coil body 21 is wound such that a winding start portion 21a and a winding end portion 21b are positioned near the lowest portion in FIG. 3.

An insulating polyester tape 22 for temporary fixation is wound around the portions where the winding start portion 21a and winding end portion 21b of the exciting coil body 21 are positioned, which are therefore covered by the polyester tape 22.

As shown in FIG. 3, the lead wires 16 and leads 18a of the diode 18 (to be described later) are connected to the winding start portion 21a and the winding end portion 21b through connecting terminals 23, respectively. As shown in FIG. 4, the diode 18 is positioned on one end portion of the exciting coil body 21 in the axial (the horizontal direction in FIG. 4). An end face of the exciting coil body 21 which faces the diode 18 will be simply referred to as a "rear surface 21c" hereinafter.

As shown in FIG. 4, a thermal fuse 24 is mounted on the other end portion of the exciting coil body 21 in the axial direction. The thermal fuse 24 is electrically connected to the exciting coil body 21 so as to be part of the winding of the exciting coil body 21.

As shown in FIG. 3, the lead wires 16 are guided to the opposite side of the exciting coil body 21 in the radial direction along the outer circumferential portion of the exciting coil body 21. As shown in FIG. 4, the lead wires 16 are inserted in a recess portion 21d formed in the outer circumferential portion of the exciting coil body 21 so as to extend in the circumferential direction.

The lead wires 16 extend in the axial direction of the exciting coil body 21 on the side of the exciting coil body 21 opposite to the connecting terminals 23 in the radial direction. The extending portion of each lead wire 16 is guided outside the field core 6 through the lead wire extraction hole 17 of the field core 6, as shown in FIG. 1. Each lead wire extraction hole 17 is formed in the outer wall 15 of the field core 6 which forms the bottom portion of the annular groove 12. A bush 25 through which the lead wire 16 extends is fitted and inserted in the lead wire extraction hole 17 in a fitted state. In this embodiment, each lead wire extraction hole 17 forms a "through hole through which a lead wire extends" in the present invention.

Figure 12:
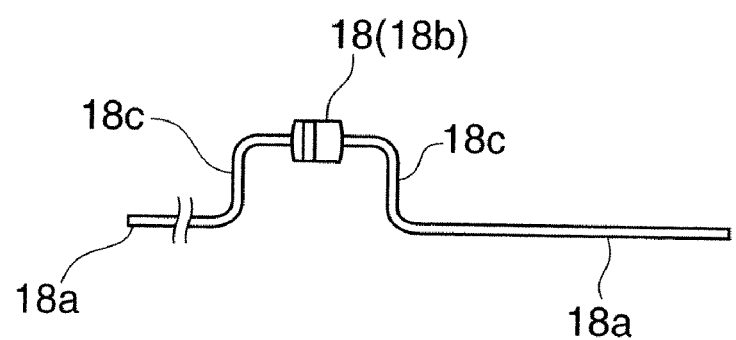
FIG. 12 is a front view of a diode.

The diode 18 serves to absorb the surge voltage generated when the power supply to the exciting coil 11 is shut off. In this embodiment, the diode 18 forms a surge voltage absorbing member in the present invention. As shown in FIG. 12, the diode 18 includes the two leads 18a and a package portion 18b from which two ends of the leads 18a extend. The package portion 18b serves to seal a diode element (not shown), and is formed into an almost columnar shape. The two leads 18a protrude from the two ends of the package portion 18b to the two sides.

As shown in FIG. 12, the two leads 18a are bent in a so-called crankshaft shape. For this reason, the leads 18a have parallel portions 18c extending in a direction perpendicular to the longitudinal direction (the horizontal direction in FIG. 12) of the package portion 18b. As shown in FIG. 4, the parallel portions 18c are oriented in the axial direction of the exciting coil body 21 while the distal ends of the leads 18a are connected to the connecting terminals 23. For this reason, the package portion 18b is located at a position spaced apart from the rear surface 21c of the exciting coil body 21 by a distance equal to the length of the parallel portion 18c in the axial direction.

As shown in FIG. 4, an insulating bush 31 (to be described later) is placed on the portion of the diode 18 which protrudes from the rear surface 21c of the exciting coil body 21.

The coil assembly 13 according to this embodiment includes the exciting coil body 21, the lead wires 16, the diode 18, and the insulating bush 31.

As shown in FIGS. 5 to 11, the insulating bush 31 includes a diode storage portion 32 to store the diode 18 and a flat holding portion 33 integrally formed on one end of the diode storage portion 32. A material which forms the insulating bush 31 is a synthetic resin having insulating properties and predetermined hardness. In this embodiment, the insulating bush 31 forms a storage member in the present invention. In the following description, one end of the diode storage portion 32 on which the holding portion 33 is provided will be referred to as a "proximal end 32a", and the other end will be referred to as a "distal end 32b" hereinafter.

Figure 5:
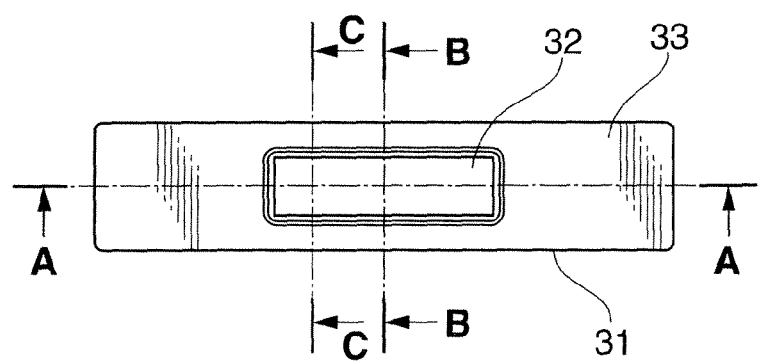
FIG. 5 is a plan view of an insulating bush.
Figure 6:
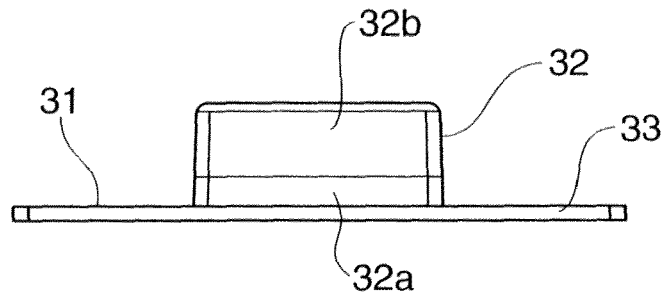
FIG. 6 is a front view of the insulating bush.
Figure 7:
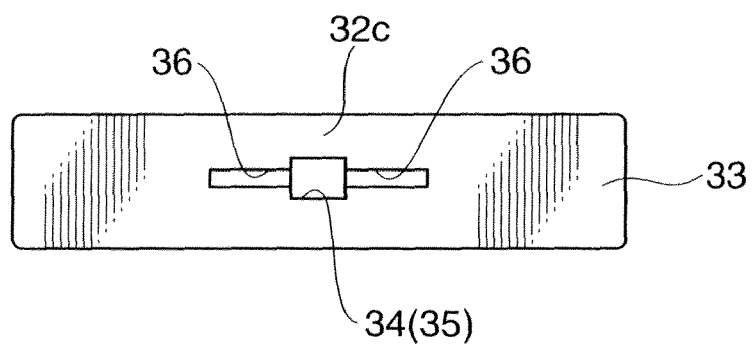
FIG. 7 is a bottom view of the insulating bush.
Figure 8:
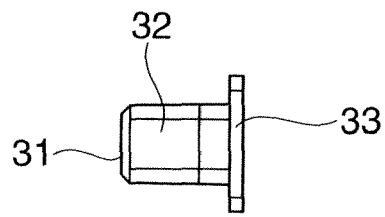
FIG. 8 is a right side view of the insulating bush.

As shown in FIGS. 5 and 6, the diode storage portion 32 is formed into a quadrangular prism longer in the horizontal direction (the tangential direction of the exciting coil body 21) than in the vertical direction. The diode storage portion 32 has a rectangular shape when seen from the axial direction of the exciting coil body 21 (see FIGS. 3 and 5). The diode storage portion 32 has an outer shape which can be fitted in the diode storage hole 19 of the field core 6, and is formed into a shape which can be press-fitted in the diode storage hole 19.

The diode storage portion 32 according to this embodiment is formed into a shape which gradually reduces in size toward the distal end 32b so as to facilitate the above press fitting. In this embodiment, a through hole in the present invention is formed by the diode storage hole 19.

The diode storage portion 32 is formed to have a height (the length between the proximal end 32a and the distal end 32b and is a height in the vertical direction in FIG. 6) larger than the thickness of the outer wall 15 of the field core 6.

As shown in FIGS. 7 and 9 to 11, a recess portion 34 for the storage of the diode 18 is formed in the diode storage portion 32. The recess portion 34 is open to an end face 32c facing the exciting coil body 21 at the proximal end 32a.

The recess portion 34 includes a package fitting groove 35 in which the package portion 18b of the diode 18 is fitted and lead fitting grooves 36 in which the leads 18a of the diode 18 are fitted.

Figure 9:
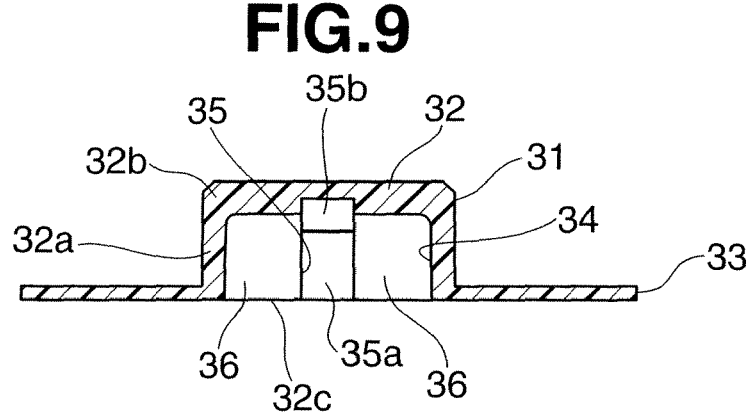
FIG. 9 is a sectional view taken along a line A-A in FIG. 5.
Figure 10:
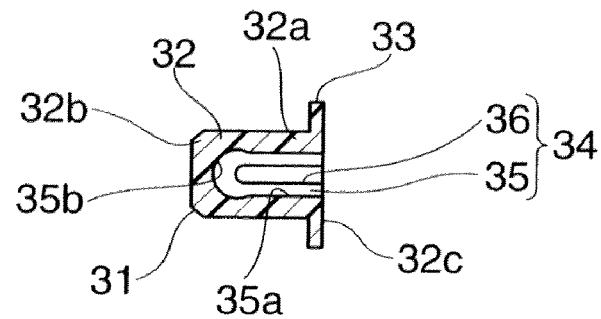
FIG. 10 is a sectional view taken along a line B-B in FIG. 5.
Figure 11:
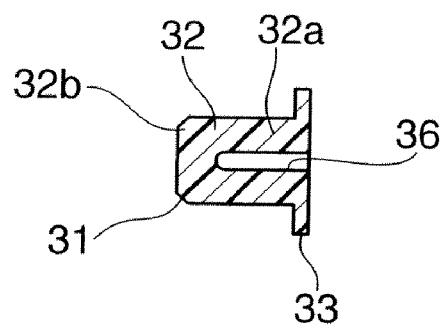
FIG. 11 is a sectional view taken along a line C-C in FIG. 5.

As shown in FIGS. 9 and 10, the package fitting groove 35 includes an insertion portion 35a extending from the end face 32c to the distal end 32b side of the diode storage portion 32 and a bottom portion 35b connected to the extending end portion of the insertion portion 35a. The groove width of the insertion portion 35a is slightly smaller than the outer diameter of the package portion 18b. The bottom portion 35b is formed into a shape in which the package portion 18b is fitted.

The lead fitting grooves 36 are formed into a shape in which the parallel portions 18c of the leads 18a can be fitted.

The hardness of the insulating bush 31 is set to a level that allows the package portion 18b to be forced into the insertion portion 35a. That is, the recess portion 34 of the insulating bush 31 has a shape in which the package portion 18b can be fitted, and is formed into a shape which is expanded when the package portion 18b is fitted.

The insulating bush 31 is placed on the diode 18 by pressing the package portion 18b against the opening portion of the package fitting groove 35 and forcing the package portion 18b into the insertion portion 35a.

In this case, the package portion 18b is pushed into the package fitting groove 35 while the insertion portion 35a is expanded, and is fitted in the bottom portion 35b. At this time, the leads 18a are fitted in the lead fitting grooves 36.

Fitting the package portion 18b in the bottom portion 35b and fitting the leads 18a in the lead fitting grooves 36 will restrict the movement of the diode 18 relative to the insulating bush 31.

As shown in FIGS. 5 and 6, the holding portion 33 of the insulating bush 31 extends from the proximal end 32a of the diode storage portion 32 in four directions parallel to the end face 32c. In this embodiment, the holding portion 33 forms a flange in the invention described in claim 2. As shown in FIG. 3, the holding portion 33 is formed to have a size (width) that covers the leads 18a of the diode 18 and parts of the connecting terminals 23 while the diode storage portion 32 is placed on the diode 18.

The holding portion 33 is fixed to the exciting coil body 21 while being stacked on the rear surface 21c of the exciting coil body 21. The holding portion 33 is fixed to the exciting coil body 21 by winding the polyester tape 22 for temporary fixation around them first and then winding an insulating cotton tape 37 (see FIG. 4). Note that in this embodiment, as shown in FIG. 4, the lead wires 16 extending along the exciting coil body 21 are also fixed to the exciting coil body 21 with the cotton tape 37.

As shown in FIG. 1, the insulating bush 31 is press-fitted in the diode storage hole 19 of the field core 6 while being mounted on the exciting coil body 21. Press-fitting the insulating bush 31 in the diode storage hole 19 in this manner will store the diode 18 in the diode storage hole 19. The parallel portions 18c of the two leads 18a of the diode 18 extend in the thickness direction of the outer wall 15 near the package portion 18b. The distal end 32b of the insulating bush 31 protrudes from the outer wall 15 of the field core 6.

The above press fitting at the time of assembly of the insulating bush is performed while the lead wires 16 are caused to extend through the bushes 25 press-fitted in the lead wire extraction holes 17. Finishing this press fitting and extracting the lead wires 16 will finish mounting the coil assembly 13 in the annular groove 12. After the coil assembly 13 is loaded in the annular groove 12 in this manner, the liquid casting resin 14 having insulating properties is injected into the annular groove 12. When the casting resin 14 hardens, the coil assembly 13 is fixed in the field core 6. As shown in FIG. 1, the casting resin 14 enters in the gap formed between the outer wall 15 and the exciting coil body 21. The casting resin 14 seals the portion in which the insulating bush 31 is fitted and the portions through which the lead wires 16 extend.

Since the diode 18 of the electromagnetic clutch 1 according to this embodiment is positioned outside the field core 6, i.e., outside the annular groove 12 in which the exciting coil 11 is stored, the heat of the exciting coil 11 is difficult to transfer. In addition, the distal end portion of the insulating bush 31 protrudes from the diode storage hole 19 of the field core 6 to the outside of the field core and is in contact with the outside air.

The air around the field core 6 is stirred as the rotor 8 mounted on the electromagnetic clutch 1 rotates. The stirred air cools the insulating bush 31 and prevents a high-temperature state from continuing.

The heat load on the diode 18 according to this embodiment is therefore reduced. This prevents the diode 18 from being degraded by heat.

In addition, the insulating bush 31 in this embodiment functions as a waterproof cover for the diode 18 in effect. This makes it possible to implement a simple waterproof structure by using the insulating bush 31 for storing and holding the diode 18. This embodiment therefore need not use any dedicated waterproof cover. This can reduce the number of assembly steps as compared with the case in which a dedicated waterproof cover is used. As a consequence, the productivity of electromagnetic clutches improves.

A space for the storage of a surge voltage absorbing member need not be formed in the field core 6 used for the electromagnetic clutch 1 according to this embodiment. For this reason, a wide storage space for the exciting coil 11 is formed in the field core 6. This can increase the number of turns of the exciting coil 11 without increasing the size of the field core 6, and hence can decrease the size of the electromagnetic clutch and improve its performance.

The holding portion 33 in the form of a thin plate extending in a direction along the exciting coil 11 is formed on the end face 32c facing the exciting coil 11 at the insulating bush 31 according to this embodiment. The holding portion 33 is stacked on the exciting coil body 21, and the polyester tape 22 and the cotton tape 37 are wound around the holding portion 33. The insulating bush 31 is held on the exciting coil body 21 by fixing the holding portion 33 to the exciting coil body 21. While the insulating bush 31 is held on the exciting coil body 21, the exciting coil body 21 does not come off the insulating bush 31 when the coil assembly 13 is carried or assembled in the field core 6. This facilitates the handling of the coil assembly 13.

The recess portion 34 of the insulating bush 31 according to this embodiment has a shape in which the diode 18 can be fitted and inserted, and is formed into a shape which is elastically expanded when the diode 18 is inserted. With this arrangement, the diode 18 is firmly held by the insulating bush 31, and hence cannot freely move inside the insulating bush 31.

If the diode 18 can freely move in the insulating bush 31, the connecting portions between the diode 18 and the lead wires 16 and the exciting coil body 21 may be broken. This is because connection of the electromagnetic clutch 1, vibrations generated at the time of disconnection, external vibrations (e.g., the vibrations of the engine) transferred to the electromagnetic clutch 1, and the like will repeatedly bend the connecting portions and fatigue them.

In this embodiment, however, the diode 18, the exciting coil body 21, and the lead wires 16 do not displace from each other at the connecting portions. Therefore, the connecting portions do not break. As a consequence, this embodiment can provide an electromagnetic clutch which provides high reliability for the connecting portion of the diode 18.

The diode 18 according to this embodiment includes the leads 18a extending from the two ends of the package portion 18b. The two leads 18a have the parallel portions 18c extending in the thickness direction of the outer wall 15 of the field core 6 near the package portion 18b. For this reason, as described in this embodiment, it is possible to use, as a structure for holding the diode 18 in the recess portion 34 of the insulating bush 31, the fitting structure in which the two leads 18a restrict the movement of the package portion 18b in the longitudinal direction. As a consequence, the embodiment can provide an electromagnetic clutch which stabilizes the support of the diode 18.

In addition, according to this embodiment, the diode 18 is located on the rear surface side of the field core 6, i.e., a position to face the front housing 4 of the car air conditioner compressor 2. In general, the front housing 4 of the car air conditioner compressor 2 is positioned on the coolant inlet side. The diode 18 according to this embodiment is placed at a position near the front housing 4 at which the temperature is relatively low. This further reduces the heat load on the diode 18.

(Second Embodiment)

The electromagnetic coupling device according to the present invention can be configured as shown in FIGS. 13 to 22. The same reference numerals as in FIGS. 1 to 12 denote the same or similar members in FIGS. 13 to 22, and a detailed description of the members will be omitted, as needed.

Figure 13:
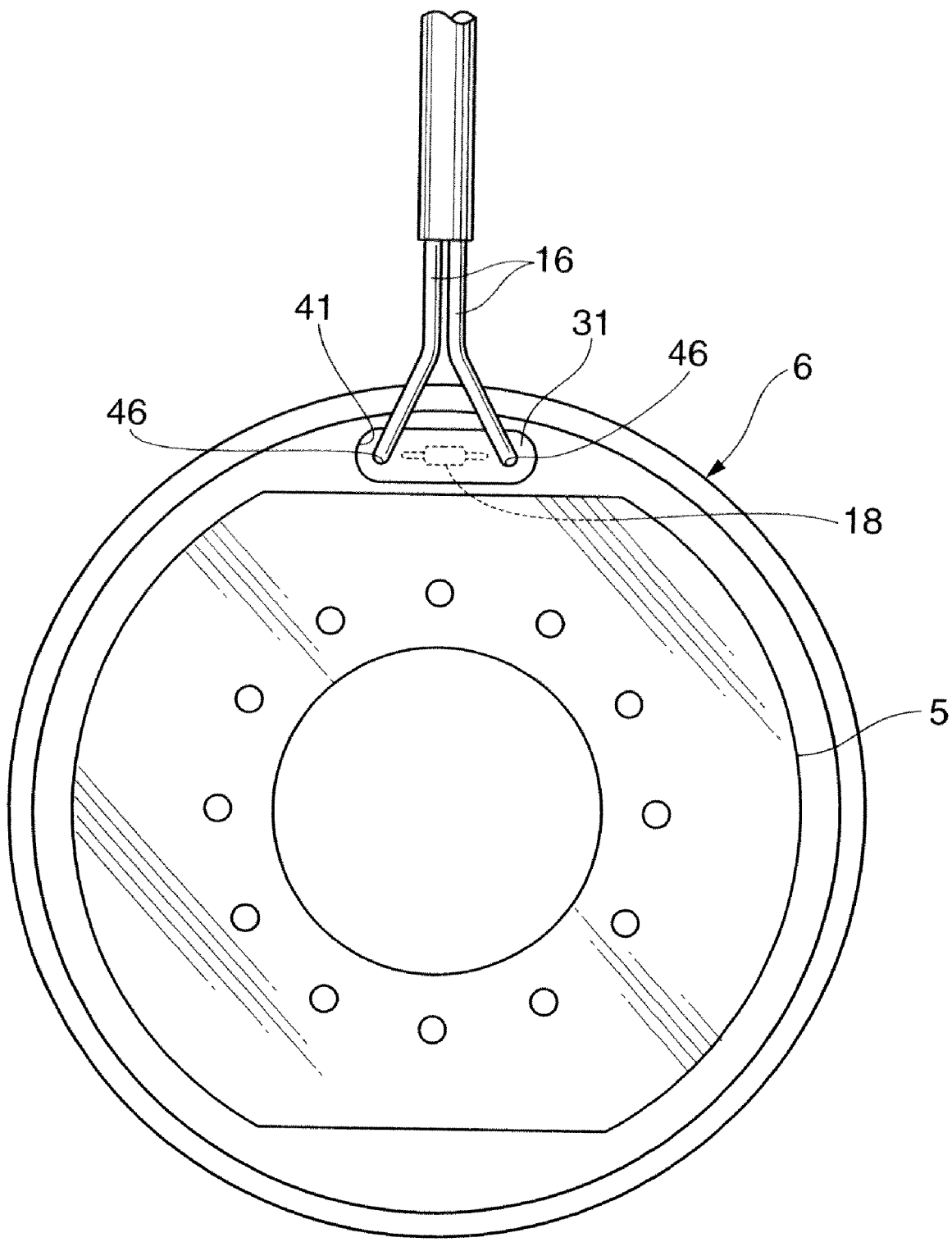
FIG. 13 is a rear view of a field core.

A field core 6 shown in FIG. 13 is mounted in an electromagnetic clutch to transfer and disconnect power to a car air conditioner compressor 2. A portion other than the field core 6 of the electromagnetic clutch can employ the same arrangement as that of the electromagnetic clutch 1 described in the first embodiment.

As shown in FIG. 13, the field core 6 according to this embodiment employs a structure in which lead wires 16 and an insulating bush 31 are located at the same position. The lead wires 16 are guided outside the field core 6 through the insulating bush 31. That is, the lead wires 16 are guided outside the field core 6 through a through hole 41 of the field core 6 in which the insulating bush 31 is press-fitted.

Figure 14:
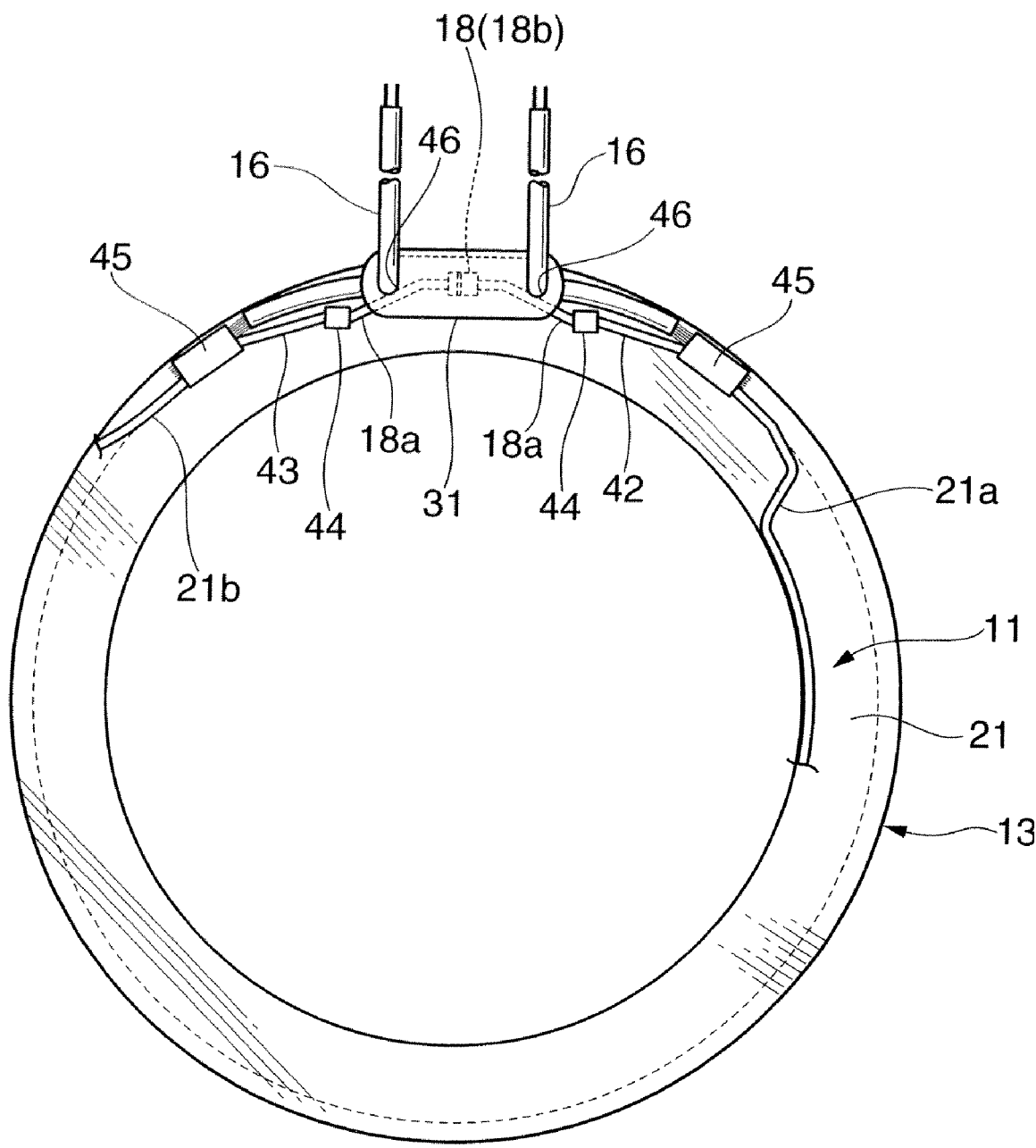
FIG. 14 is a rear view of a coil assembly.
Figure 15:
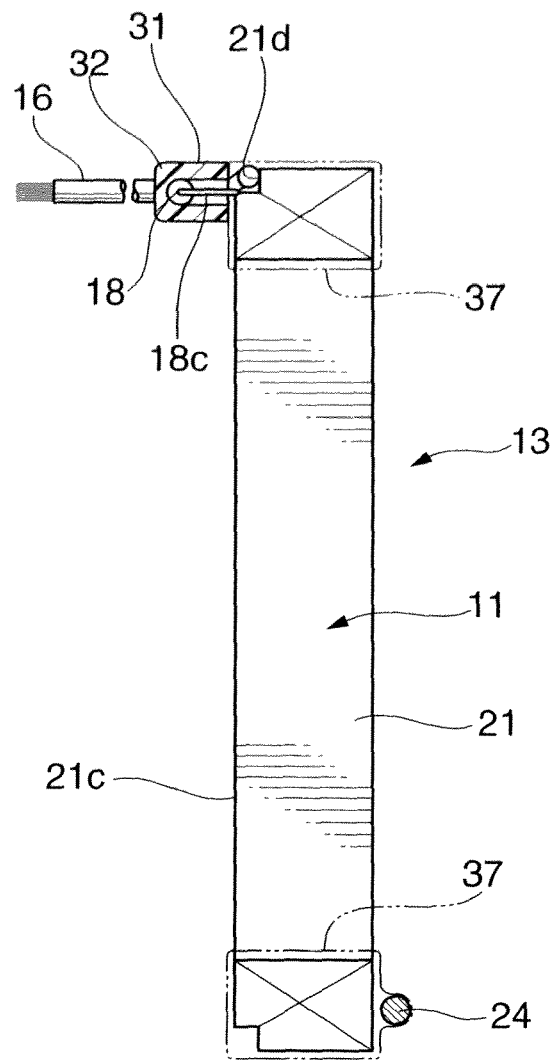
FIG. 15 is a sectional view of the coil assembly.
Figure 20:
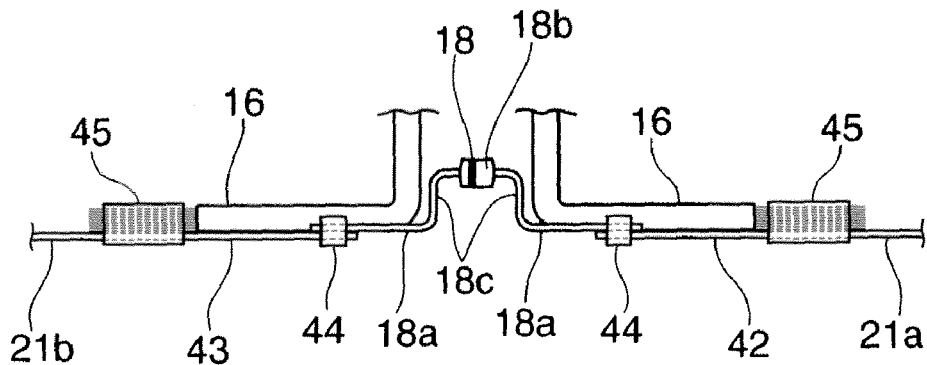
FIG. 20 is a developed view of a diode connecting portion.

As shown in FIG. 14, a coil assembly 13 provided for the field core 6 is configured such that a diode 18 is located at the highest position in FIG. 13. As shown in FIGS. 14 and 20, leads 18a of the diode 18 are respectively connected to an end portion 42 of a winding start portion 21a and an end portion 43 of a winding end portion 21b of an exciting coil body 21 through connecting terminals 44.

On the other hand, the lead wires 16 are connected, through connecting terminals 45, to the portions of the winding start portion 21a and winding end portion 21b which are spaced apart from the end portions 42 and 43 by a predetermined distance. The winding start portion 21a, the winding end portion 21b, and the four connecting terminals 44 and 45 are fixed to the exciting coil body 21 with an insulating cotton tape (see FIG. 15) wound around the exciting coil body 21.

The lead wires 16 extend from the connecting terminals 45 in the circumferential direction of the exciting coil body 21 and are guided outside the coil assembly 13 through holes 46 of the insulating bush 31.

Figure 16:
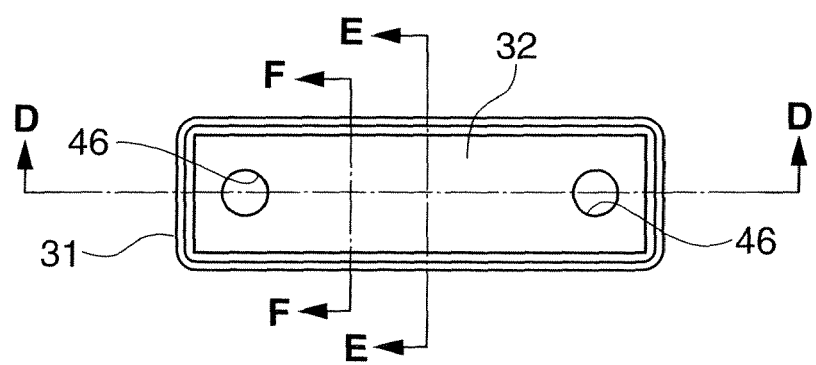
FIG. 16 is a flat view of an insulting bush.
Figure 17:
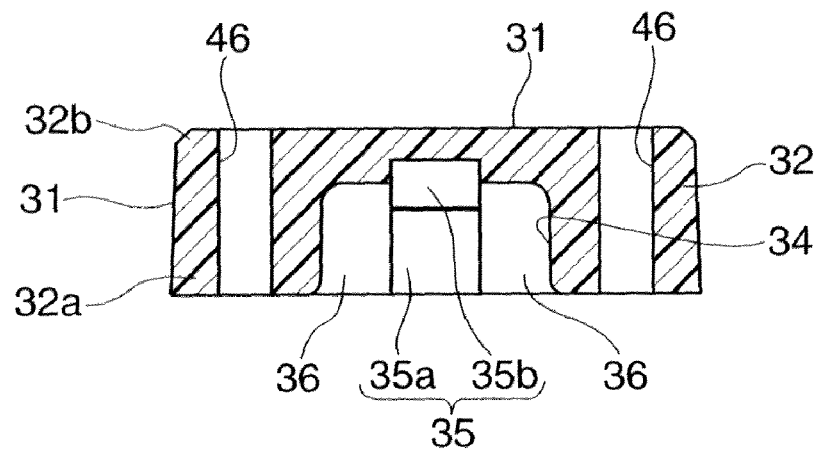
FIG. 17 is a sectional view taken along a line D-D in FIG. 16.

As shown in FIGS. 16 and 17, the insulating bush 31 according to this embodiment is formed by only a diode storage portion 32 in the form of a quadrangular prism. The through holes 46 are formed in the two end portions of the diode storage portion 32 in the longitudinal direction. The through holes 46 extend through the diode storage portion 32 in the axial direction of the field core 6.

Figure 18:
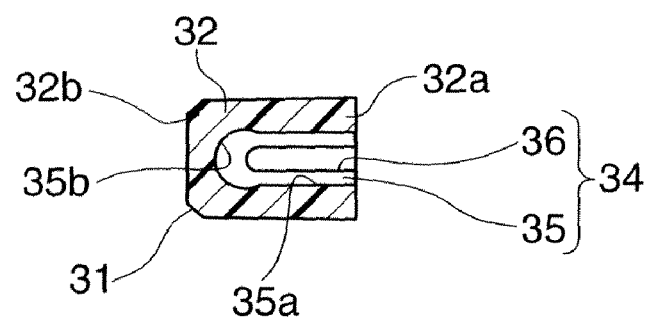
FIG. 18 is a sectional view taken along a line E-E in FIG. 16.
Figure 19:
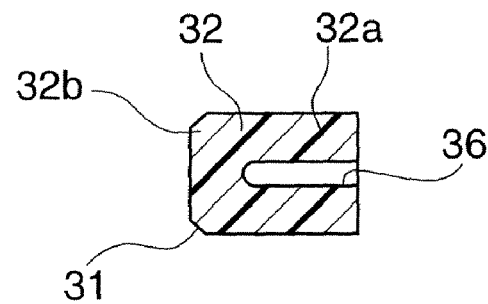
FIG. 19 is a sectional view taken along a line F-F in FIG. 16.

A recess portion 34 in which the diode 18 is to be fitted is formed between the two through holes 46. As shown in FIGS. 17 to 19, the recess portion 34 has the same structure as the recess portion 34 of the insulating bush 31 described in the first embodiment.

The insulating bush 31 is mounted on the exciting coil body 21 by pushing the diode 18 into the recess portion 34 with the lead wires 16 extending through the through holes 46. The insulating bush 31 is held on the lead wires 16 so as not to freely move relative to the exciting coil body 21 by making the lead wires 16 extend through the through holes 46.

As described above, the insulating bush 31 is press-fitted into the through hole 41 (see FIG. 13) of the field core 6 while being mounted on the exciting coil body 21. The through hole 41 has a shape in which the diode storage portion 32 of the insulating bush 31 can be fitted, and is formed into a shape in which the diode storage portion 32 can be press-fitted. After the insulating bush 31 is press-fitted, a liquid casting resin 14 having insulating properties is injected into an annular groove 12 of the field core 6 to fix the coil assembly 13 in the field core 6, as in the first embodiment.

The lead wires 16 according to this embodiment are made to extend through the through holes 46 of the insulating bush 31 in a press-fitted state. That is, the insulating bush 31 is held by the lead wires 16. This prevents the insulating bush 31 from coming off the exciting coil body 21 when assembling the field core 6, and hence eliminates the necessity to wind a polyester tape 22 for temporary fixation. It is therefore easy to assemble the field core 6 as compared with the case in the first embodiment.

In addition, in this embodiment, the lead wires 16 extend through an outer wall 15 of the field core 6 by using the through hole 41 in which the insulating bush 31 is to be press-fitted. For this reason, this embodiment allows to easily manufacture the field core 6 as compared with the case (described in the first embodiment) in which the through holes dedicated to make the lead wires 16 extend through and the through hole dedicated to make the insulating bush 31 be press-fitted are formed in the field core 6.

Figure 21:
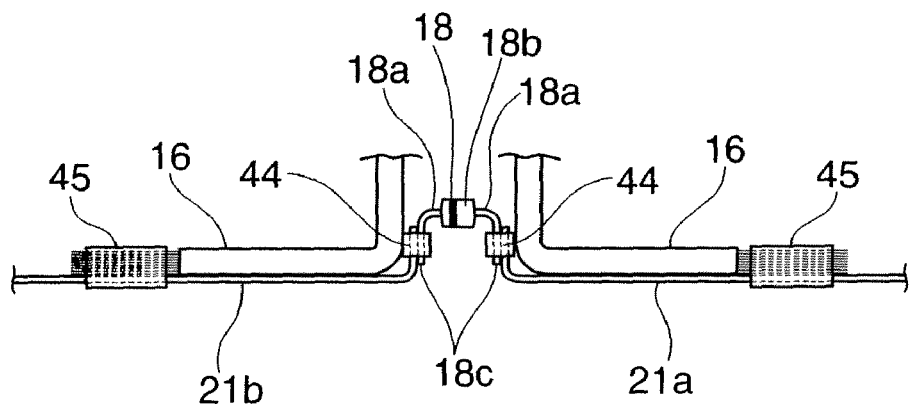
FIG. 21 is a developed view of the diode connecting portion.
Figure 22:
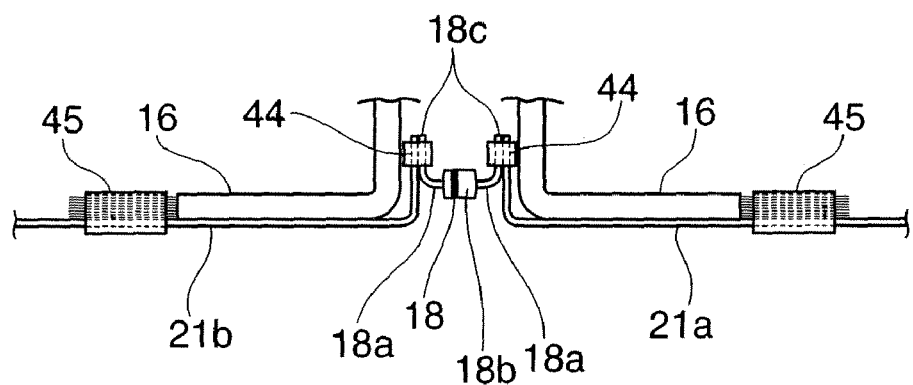
FIG. 22 is a developed view of the diode connecting portion.

The connecting portions between the leads 18a of the diode 18 and the winding start portion 21a and winding end portion 21b of the exciting coil body 21 can be formed into shapes like those shown in FIGS. 21 and 22.

Each lead 18a shown in FIGS. 21 and 22 is cut at a portion located closer to the distal end than the parallel portion 18c. On the other hand, the winding start portion 21a and winding end portion 21b of the exciting coil body 21 each are formed to have a length to reach the parallel portion 18c. The parallel portions 18c are respectively connected to the winding start portion 21a and the winding end portion 21b through the connecting terminals 44.

The package portion 18b of the diode 18 shown in FIG. 21 is connected to the winding start portion 21a and the winding end portion 21b while the package portion 18b is spaced apart from the exciting coil body 21 relative to the parallel portions 18c. The package portion 18b of the diode 18 shown in FIG. 22 is connected to the winding start portion 21a and the winding end portion 21b while the package portion 18b is located closer to the exciting coil body 21 than the parallel portions 18c.

Using the arrangements shown in FIGS. 21 and 22 makes it possible to store the diode connecting terminals 44 in the insulating bush 31. Therefore, using this embodiment eliminates the necessity to perform the operation of fixing the terminal portions by winding the polyester tape 22 for temporary fixation around the connecting terminals 44 and the exciting coil body 21. In addition, since the number of bent portions of the leads 18a decreases from four to two, the assembly work of the field core 6 is further facilitated.

(Third Embodiment)

An electromagnetic coupling device according to the present invention can have arrangements like those shown in FIGS. 23 to 27. The same reference numerals as in FIGS. 1 to 22 denote the same or similar members in FIGS. 23 to 27, and a detailed description of the members will be omitted, as needed.

Figure 23:
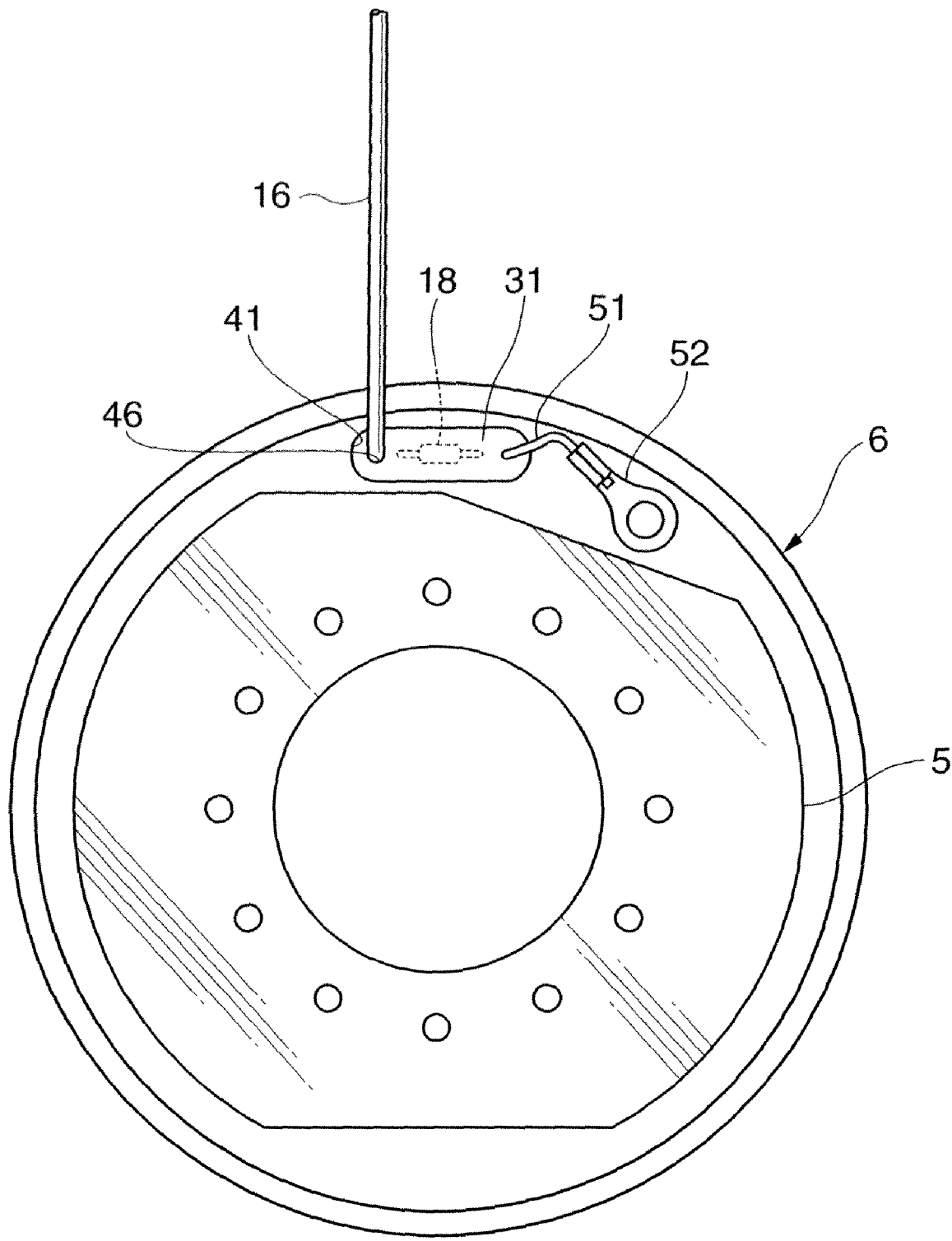
FIG. 23 is a rear view of the field core.

A field core 6 shown in FIG. 23 is mounted in a body earth type electromagnetic coupling device. This electromagnetic coupling device can employ the same arrangement as that of the electromagnetic clutch 1 described in the first or second embodiment except for the field core 6.

The field core 6 shown in FIG. 23 includes one lead wire 16 and one body earth wire 51. The lead wire 16 and body earth wire 51 are guided outside the field core 6 through an insulating bush 31. The insulating bush 31 is equivalent to the insulating bush 31 described in the second embodiment.

An earth terminal 52 is fixed to the distal end portion of the body earth wire 51 by caulking. The earth terminal 52 is fixed to the field core 6 so as to be conductive thereto.

Figure 24:
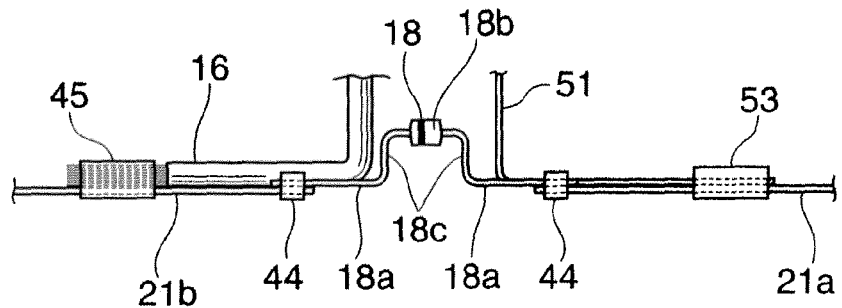
FIG. 24 is a developed view of the diode connecting portion.

The body earth wire 51 can have arrangements like those shown in FIGS. 24 to 27. The body earth wire 51 shown in FIG. 24 is connected to the winding start portion 21a of the exciting coil body 21 through a connecting terminal 53.

Figure 25:
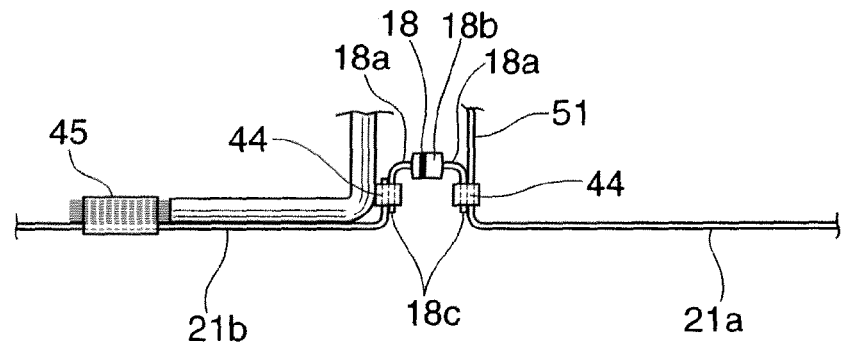
FIG. 25 is a developed view of the diode connecting portion.
Figure 26:
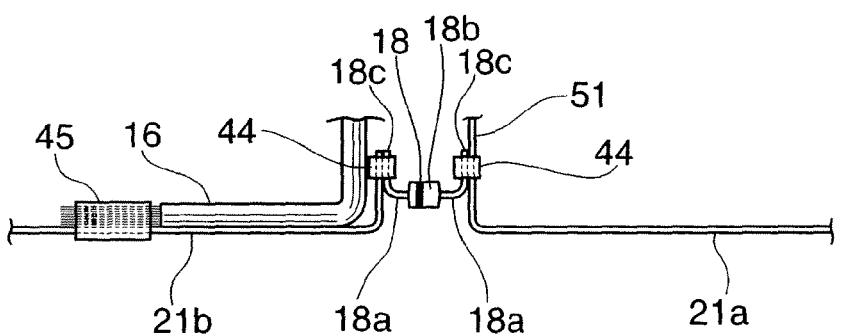
FIG. 26 is a developed view of the diode connecting portion.

Leads 18a of each of diodes 18 shown in FIGS. 25 and 26 are cut at parallel portion 18c, and are respectively connected to a winding start portion 21a and winding end portion 21b of an exciting coil body 21 through connecting terminals 44 at the parallel portions 18c. The diode 18 shown in FIG. 25 is configured such that the parallel portions 18c, of the parallel portions 18c and the package portion 18b, are respectively connected to the winding start portion 21a and the winding end portion 21b while being spaced apart from the exciting coil body 21.

On the other hand, in the case of the diode 18 shown in FIG. 26, the package portion 18b, of the parallel portions 18c and the package portion 18b, is connected to the winding start portion 21a and the winding end portion 21b while being located near the exciting coil body 21.

The body earth wires 51 shown in FIGS. 25 and 26 each are formed by an extended portion obtained by extending the winding start portion 21*a* from the connecting terminal 44.

Figure 27:
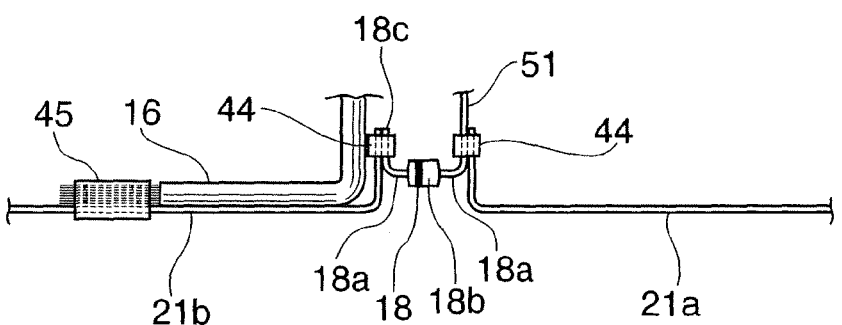
FIG. 27 is a developed view of the diode connecting portion.

The body earth wire 51 shown in FIG. 27 is formed by one lead 18*a* of the diode 18. This lead 18*a* extends from the package portion 18*b* in the direction opposite to the exciting coil body 21, and is connected to the winding start portion 21*a* through the connecting terminal 44 halfway along the extending portion. The other lead 18*a* is bent to be parallel to one lead 18*a* and is cut at the parallel portion 18*c*. The other lead 18*a* is connected to the winding end portion 21*b* through the connecting terminal 44 at the parallel portion 18*c*.

The leads 18*a* of the diodes 18 shown in FIGS. 25 to 27 each have two bent portions. This facilitates bending operation.

Using the arrangements described in this embodiment can obtain the same effects as those obtained by using the arrangements in the first and second embodiments described above.

(Fourth Embodiment)

A storage member according to the present invention can be formed as shown in FIGS. 28 to 34. The same reference numerals as in FIGS. 1 to 27 denote the same or similar members in FIGS. 28 to 34, and a detailed description of the members will be omitted, as needed.

Figure 28:
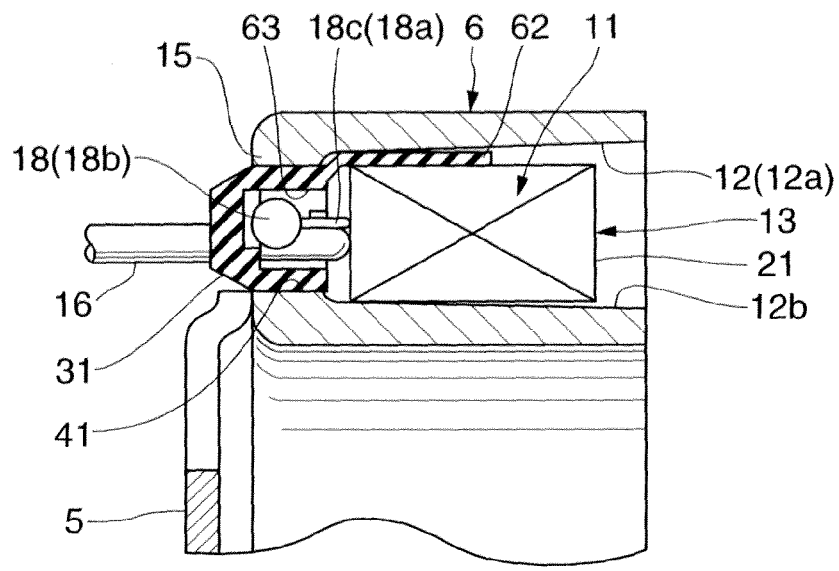
FIG. 28 is a partial enlarged sectional view of the field core.
Figure 29:
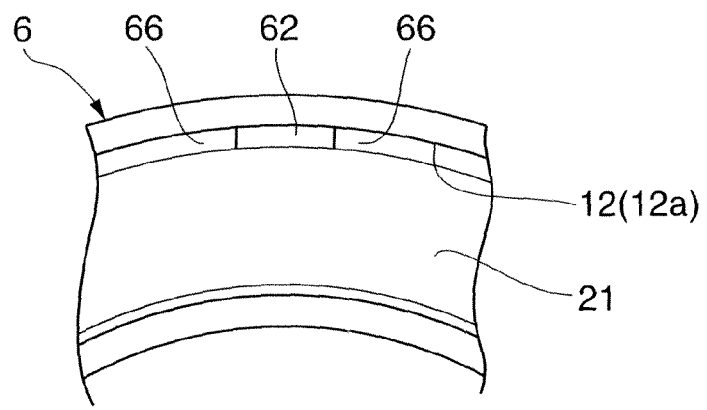
FIG. 29 is a partial enlarged sectional view of the field core.
Figure 30:
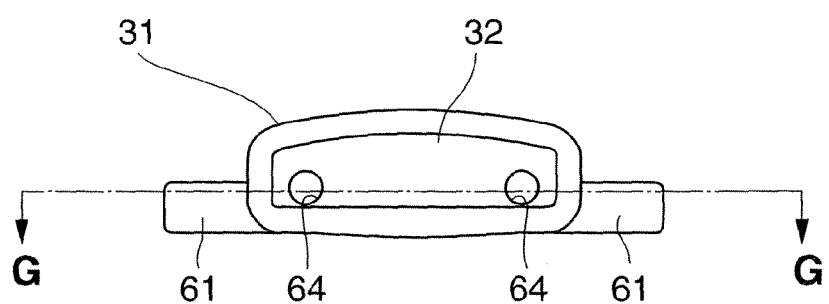
FIG. 30 is a plan view of an insulating bush.

A field core 6 shown in FIGS. 28 and 29 is mounted in an electromagnetic clutch to transfer and disconnect power with respect to a car air conditioner compressor 2. A portion other than the field core 6 of the electromagnetic clutch can employ the same arrangement as that of the electromagnetic clutch 1 described in the first embodiment.

The field core 6 is formed into an annular shape having an annular groove 12. A coil assembly 13 having an exciting coil 11 is stored in the annular groove 12. Although not shown, the annular groove 12 is filled with a casting resin 14 (not shown) having insulating properties while the coil assembly 13 is inserted in the annular groove 12. The coil assembly 13 is fixed in the annular groove 12 by hardening the casting resin 14 in the annular groove 12.

An insulating bush 31 is mounted on an outer wall 15 forming the bottom of the annular groove 12 of the field core 6. The insulating bush 31 is press-fitted in a through hole 41 formed in the outer wall 15. The insulating bush 31 stores a diode 18 as a surge voltage absorbing member. A lead wire 16 connected to an exciting coil body 21 of the coil assembly 13 extends through the insulating bush 31.

Figure 31:
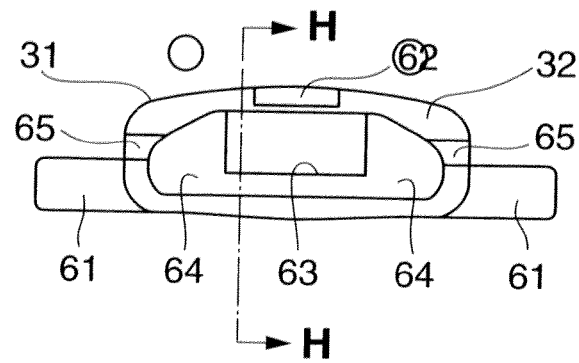
FIG. 31 is a bottom view of the insulating bush.
Figure 32:
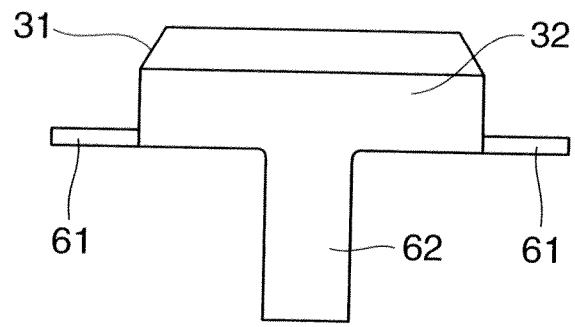
FIG. 32 is a rear view of the insulating bush.
Figure 33:
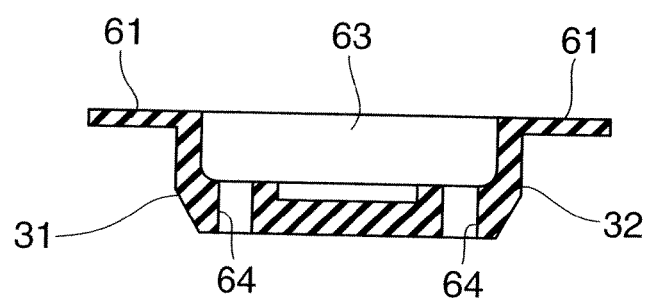
FIG. 33 is a sectional view taken along a line G-G in FIG. 30.
Figure 34:
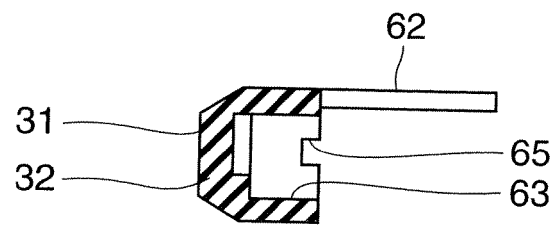
FIG. 34 is a sectional view taken along a line H-H in FIG. 31.

As shown in FIGS. 30 to 34, the insulating bush 31 according to this embodiment includes a diode storage portion 32 to store the diode 18, a pair of holding pieces 61 integrally formed on one end portion of the diode storage portion 32, and one tongue-like piece 62 (see FIGS. 32 and 34). A recess portion 63 to store the diode 18 and through holes 64 to allow the lead wires 16 to pass through are formed in the diode storage portion 32.

As shown in FIG. 31, the recess portion 63 is positioned in a middle portion of the diode storage portion 32 in the widthwise direction (in the circumferential direction of the field core 6). The through holes 64 are positioned on the two sides of the recess portion 63. As shown in FIGS. 33 and 34, the recess portion 63 is open to one end portion of the diode storage portion 32. As shown in FIG. 28, the recess portion 63 is formed to have a size that allows a package portion 18*b*, leads 18*a*, and parallel portions 18*c* of the diode 18 to be inserted. The insulating bush 31 is mounted on the field core 6 such that the opening of the recess portion 63 is oriented to the exciting coil body 21.

As shown in FIGS. 31 and 34, grooves 65 are formed at positions corresponding to the one end portion of the diode storage portion 32 and the two end portions of the diode storage portion 32 in the widthwise direction. The grooves 65 extend in the widthwise direction to connect the inside of the recess portion 63 to the sides of the diode storage portion 32. That is, while the insulating bush 31 is mounted on the field core 6, the recess portion 63 communicates with the annular groove 12 through the grooves 65. For this reason, the casting resin 14 injected into the annular groove 12 also flows into the recess portion 63 through the grooves 65. When the casting resin 14 flows into the recess portion 63 in which the diode 18 is inserted and hardens, the diode 18 is fixed in the diode storage portion 32.

Since the diode 18 is fixed by the casting resin 14 in this manner, the recess portion 63 can be formed into a simple shape. That is, the lead fitting grooves 36 of the insulating bush 31 described in the first and second embodiments are not formed in the insulating bush 31 according to this embodiment.

The holding pieces 61 have the same function as that of the holding portion 33 described in the first embodiment. The holding pieces 61 protrude from the diode storage portion 32 to the two sides in the widthwise direction. The holding pieces 61 are fixed to the exciting coil body 21 with an insulating cotton tape (see FIG. 4).

The tongue-like piece 62 is in the shape of a strip plate. As shown in FIG. 28, the tongue-like piece 62 protrudes from one end portion of the diode storage portion 32 which is located near an outer peripheral wall 12*a* of the annular groove 12 toward the exciting coil body 21. As shown in FIGS. 31 and 32, the tongue-like piece 62 is positioned in the middle portion of the diode storage portion 32 in the widthwise direction. As shown in FIG. 28, the tongue-like piece 62 has a length to extend from the bottom of the annular groove 12 to a middle portion in the depth direction.

The insulating bush 31 according to this embodiment is mounted on the exciting coil body 21 by inserting the diode 18 into the recess portion 63 and making the lead wires 16 extend through the through holes 64. The coil assembly 13 having the exciting coil body 21 and the coil assembly 13 is inserted into the annular groove 12 of the field core 6 and is fixed thereafter when the casting resin 14 injected into the annular groove 12 hardens.

When the coil assembly 13 is inserted into the annular groove 12 as describe above, the cotton tape wound around the exciting coil body 21 comes into contact with the peripheral wall. This is because, since the number of turns of the coil is maximized to increase the magnetomotive force, the gap between the peripheral wall of the annular groove 12 (the outer peripheral wall 12*a* and an inner peripheral wall 12*b*) and the exciting coil body 21 is small. When the outer circumferential portion of the exciting coil body 21 is entirely in contact with the peripheral wall, it is not possible to sufficiently inject the casting resin 14. This may lead to a casting failure.

The reason why a casting failure occurs is that in order to make the casting resin 14 flow to the bottom portion of the annular groove 12 (between the exciting coil body 21 and the outer wall 15), the casting resin 14 needs to flow through the narrow gap and flow while permeating the cotton tape and dripping down. That is, it is thought that a casting error occurs as described above because the casting resin 14 hardens inside the gap or the cotton tape before it flows to the bottom portion.

In order to solve this problem, in this embodiment, the insulating bush 31 is provided with the tongue-like piece 62.

As shown in FIG. 28, the tongue-like piece 62 is clamped between the peripheral wall 12a of the annular groove 12 and the exciting coil body 21 by inserting the coil assembly 13 into the annular groove 12. In this structure, since the tongue-like piece 62 is clamped between them, the cotton tape of the exciting coil body 21 is compressed, and the exciting coil body 21 is slightly decentered from the annular groove 12. This forms a flow path 66 (see FIG. 29) between the exciting coil body 21 and the peripheral wall 12a.

The flow path 66 extends from the opening portion of the annular groove 12 to the bottom portion. Therefore, the casting resin 14 injected after the coil assembly 13 is inserted into the annular groove 12 easily flows to the bottom portion through the flow path 66.

This embodiment can therefore provide the field core 6 in which the coil assembly 13 is reliably insulated and fixed with the casting resin 14.

The tongue-like piece 62 according to this embodiment is provided on the insulating bush 31 through which the lead wires 16 extend. However, it is also possible to provide the insulating bush 31 like that described in the first embodiment on the insulating bush 31, i.e., the insulating bush 31 through which no lead wire extends.

The first to fourth embodiments described above each have exemplified the diode 18 as a surge voltage absorbing member. However, a surge voltage absorbing member is not limited to the diode 18, and any other kinds of members can be used as long as they can absorb surge voltages.

Since the surge voltage absorbing member according to the present invention is positioned outside the field core, heat of exciting is not easily transferred to the member. In addition, part of the storage member is exposed outside the field core through the through hole and comes into contact with the outside air.

The air around the field core is stirred as the rotor mounted in this electromagnetic coupling device rotates. The stirred air cools the storage member.

In this electromagnetic coupling device, therefore, the heat load on the surge voltage absorbing member is therefore reduced. This prevents the surge voltage absorbing member from being degraded by heat.

In addition, the storage member used in this electromagnetic coupling device according to the present invention functions as a waterproof cover for the surge voltage absorbing member in effect. This can make the surge voltage absorbing member waterproof by using a simple structure using a member to store and hold the surge voltage absorbing member. That is, there is no need to use any dedicated waterproof cover. According to the present invention, therefore, it is possible to reduce the number of assembly steps as compared with the case in which a dedicated waterproof cover is used. As a consequence, the productivity of electromagnetic coupling devices can be improved.

Furthermore, there is no need to form a space to store the surge voltage absorbing member inside the field core used for this electromagnetic coupling device. That is, since a large storage space for the exciting coil is formed in the field core, it is possible to increase the number of turns of the exciting coil without increasing the size of the field core. Therefore, the present invention can provide an electromagnetic coupling device exhibiting high performance in spite of being compact.

What is claimed is:

1. An electromagnetic coupling device comprising:
 a coil assembly comprising
  an exciting coil,
  a lead wire connected to a winding start portion of said exciting coil,
  a surge voltage absorbing member connected to a winding end portion of said exciting coil protruding from an end face of said exciting coil,
  a storage member which is made of an insulating material and includes a recess portion to store said surge voltage absorbing member, and
  a field core comprising an annular groove which stores said coil assembly and a through hole which extends through a bottom portion of said annular groove in an axial direction of said field core,
 wherein said storage member is press-fitted into said through hole with an opening of said recess portion facing said exciting coil, and
 said surge voltage absorbing member is stored in a bottom portion of said recess portion so as to be positioned outside said field core by said exciting coil.

2. A device according to claim 1, wherein a flange in a thin plate shape extending in a direction along said exciting coil is formed on one end portion of said storage member which faces said exciting coil.

3. A device according to claim 1, wherein a through hole through which a lead wire of said exciting coil extends is formed in said storage member.

4. A device according to claim 1, wherein said recess portion of said storage member has a shape which allows said surge voltage absorbing member to be fitted and is formed into a shape which is expanded by elastic deformation when said surge voltage absorbing member is fitted therein.

5. A device according to claim 1, wherein said surge voltage absorbing member is a diode including a pair of leads extending from two ends of a package portion, said pair of leads including parallel portions extending in a thickness direction of an outer wall near said package portion.

6. A device according to claim 1, wherein said field core is formed into an annular shape, the exciting coil is stored in the annular groove of said field core, and said storage member includes a tongue-like piece clamped between a peripheral wall of said annular groove and said exciting coil.

* * * * *

UNITED STATES PATENT AND TRADEMARK OFFICE
CERTIFICATE OF CORRECTION

PATENT NO.         : 8,294,545 B2                             Page 1 of 1
APPLICATION NO.    : 12/868564
DATED              : October 23, 2012
INVENTOR(S)        : Kurosu et al.

It is certified that error appears in the above-identified patent and that said Letters Patent is hereby corrected as shown below:

On the Title Page, please delete "6 Claims" and insert --8 Claims--.

In the Claims

Column 14, Claim 1, please delete lines 11-31 and insert
--1. An electromagnetic coupling device comprising
a coil assembly comprising
an exciting coil,
   a pair of wires connected to a winding start portion and a winding end portion of said exciting coil, respectively,
   a surge voltage absorbing member connected between the winding start portion and the winding end portion of said exciting coil protruding from an end face of said exciting coil, and
   a storage member which is made of an insulating material and includes a recess portion placed on said surge voltage absorbing member; and
   a field core comprising an annular groove which stores said coil assembly and a through hole which extends through a bottom portion of said annular groove in an axial direction of said field core,
   wherein said storage member is press-fitted into said through hole with an opening of said recess portion facing said exciting coil, and
   said surge voltage absorbing member is stored in a bottom portion of said recess portion so as to be positioned outside said field core by said exciting coil--.

Column 14, Claim 5, please delete lines 44-48 and insert
--5. A device according to claim 1, wherein said surge voltage absorbing member is a diode including a pair of leads extending from two ends of a package portion.--.

Column 14, after Claim 6, line 53, please insert the following claims
--7. A device according to claim 1, wherein said pair of wires are a pair of lead wires.

8. A device according to claim 1, wherein said pair of wires are a lead wire and an earth wire.--.

Signed and Sealed this
Eighth Day of April, 2014

Michelle K. Lee
*Deputy Director of the United States Patent and Trademark Office*